United States Patent
Ben-Tovim et al.

(10) Patent No.: US 10,826,671 B2
(45) Date of Patent: Nov. 3, 2020

(54) DYNAMIC RESOURCE ALLOCATION (DRA) FOR COMMUNICATION SYSTEMS

(71) Applicant: Sckipio Technologies S.I LTD, Ramat Gan (IL)

(72) Inventors: Erez Ben-Tovim, Carcour (IL); Guy Reina, Givatayim (IL); Rami Verbin, Tel Aviv (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 0 days.

(21) Appl. No.: 16/070,627

(22) PCT Filed: Jan. 18, 2017

(86) PCT No.: PCT/IL2017/050065
§ 371 (c)(1),
(2) Date: Jul. 17, 2018

(87) PCT Pub. No.: WO2017/125922
PCT Pub. Date: Jul. 27, 2017

(65) Prior Publication Data
US 2019/0207736 A1 Jul. 4, 2019

Related U.S. Application Data

(60) Provisional application No. 62/279,852, filed on Jan. 18, 2016.

(51) Int. Cl.
*H04L 5/00* (2006.01)
*H04B 3/32* (2006.01)
(Continued)

(52) U.S. Cl.
CPC ............. *H04L 5/0087* (2013.01); *H04B 1/38* (2013.01); *H04B 3/32* (2013.01); *H04J 3/0658* (2013.01);
(Continued)

(58) Field of Classification Search
CPC ... H04B 1/38; H04B 1/40; H04B 1/50; H04B 1/52; H04B 1/54; H04B 1/56; H04B 3/02;
(Continued)

(56) References Cited

U.S. PATENT DOCUMENTS

2011/0032855 A1 2/2011 Kim et al.
2013/0070757 A1 3/2013 Elliott et al.
(Continued)

FOREIGN PATENT DOCUMENTS

EP 2661009 A2 11/2013

OTHER PUBLICATIONS

Extended European Search Report dated Jul. 4, 2019 for Application No. 17741183.2 (11 pages).
(Continued)

*Primary Examiner* — Young T. Tse
(74) *Attorney, Agent, or Firm* — Brown Rudnick LLP (57) ABSTRACT

A method for dynamically modifying a frame structure in transceiving of data between a network side entity and at least one node, the data is divided among a plurality of frames, the method comprising: providing an upstream management symbol offset position with respect to a frame reference point, the upstream management symbol offset position is associated with an upstream management symbol that is configured to at least convey downstream acknowledgement data; providing an updated frame structure to the at least one node, including: information defining a transition point between downstream and upstream; and a reference point indicating when the updated frame structure shall take effect; receiving the updated frame structure by the at least one node; and employing the updated frame structure from the reference point, by the network side entity.

20 Claims, 8 Drawing Sheets

(51) Int. Cl.
    *H04B 1/38*    (2015.01)
    *H04J 3/06*    (2006.01)
    *H04J 3/10*    (2006.01)
    *H04M 3/34*    (2006.01)
    *H04L 5/14*    (2006.01)
(52) U.S. Cl.
    CPC ............... *H04J 3/10* (2013.01); *H04L 5/14* (2013.01); *H04M 3/34* (2013.01); *H04L 5/0091* (2013.01); *H04L 5/1469* (2013.01)
(58) Field of Classification Search
    CPC .. H04B 3/40; H04B 3/42; H04J 3/0638; H04J 3/0658; H04J 3/10; H04J 3/14; H04L 5/0087; H04L 5/14; H04L 5/1407; H04M 3/34
    USPC ....... 375/219, 220, 222, 257, 259, 358, 366; 370/282, 283, 294, 337, 347, 350, 370/509–513; 455/500, 502, 507
    See application file for complete search history.

(56) References Cited

U.S. PATENT DOCUMENTS

| | | | | |
|---|---|---|---|---|
| 2014/0254791 A1* | 9/2014 | Wei | ...................... | H04M 11/062 |
| | | | | 379/406.01 |
| 2014/0307749 A1* | 10/2014 | Liang | .................. | H04L 27/2601 |
| | | | | 370/509 |
| 2014/0328442 A1 | 11/2014 | Liu et al. | | |
| 2015/0055449 A1 | 2/2015 | Li et al. | | |
| 2015/0215059 A1* | 7/2015 | Kerpez | ................ | H04M 11/062 |
| | | | | 379/406.01 |
| 2015/0280892 A1* | 10/2015 | Verbin | .................. | H04L 5/0007 |
| | | | | 370/294 |
| 2015/0349938 A1* | 12/2015 | Trojer | .................. | H04L 5/0064 |
| | | | | 370/281 |
| 2016/0020823 A1 | 1/2016 | Kuipers et al. | | |
| 2016/0036491 A1* | 2/2016 | Sorbara | .................... | H04B 3/32 |
| | | | | 370/294 |
| 2017/0048035 A1* | 2/2017 | Verbin | .................. | H04L 5/1492 |

OTHER PUBLICATIONS

Sckipio: Dynamic Bandwidth Allocation (DBA) for G.fast—first concepts and open questions; 2015-11-Q4-038 ITU-T Draft; Study Period 2013-2016, International Telecommunication Union, Geneva; CH vol. 4/15, Jan. 6, 2016, pp. 1-5, XP044158557.

"G.9701 LC2 text R3 interim 8;G.9701R3", ITU-T Draft; Study Period 2013-2016; Study group 15; Series G.9701R3, International Telecommunication Union, Geneva; CH, vol. 4/15, Dec. 4, 2014, 348 pages, XP044235035.

International Search Report and Written Opinion dated May 18, 2017 for International Application No. PCT/IL2017/050065 (10 Pages).

* cited by examiner

DYNAMIC RESOURCE ALLOCATION (DRA) FOR COMMUNICATION SYSTEMS

FIELD OF THE DISCLOSED TECHNIQUE

The disclosed technique relates to communication systems in general, and methods and systems for dynamic resource allocation, in particular.

BACKGROUND OF THE DISCLOSED TECHNIQUE

G.fast (G series International Telecommunication Union (ITU)-T recommendation for fast access to subscriber terminals), was originally designed for operation over twisted-pair cabling, addressing fiber-to-the-distribution-point (FTTdp) deployments where a distribution point unit (DPU) is connected with a plurality of customer premises equipment (CPE) units in a point-to-point topology. In addition to operation over twisted pairs, there is a need by service providers to also enable the use of G.fast over short coax and CAT5 (category 5) wires (up to 200 meters) for broadband access to multiple dwelling units (MDUs).

With typical twisted-pair cabling, crosstalk is a major issue. Near-end crosstalk (NEXT) is typically avoided in G.fast by using synchronized time division duplex (TDD) frames with the same downstream and upstream division is used for all communication lines connecting the DPU and CPEs. Far-end crosstalk (FEXT) is mitigated by employing vectoring on these lines to eliminate crosstalk.

Originally, G.fast, as with many TDD systems, was designed such that the TDD division between downstream traffic and upstream traffic is fixed. As the technology evolves, and user traffic needs increase, there is a need to dynamically change this division based on changing traffic requirements.

SUMMARY OF THE PRESENT DISCLOSED TECHNIQUE

It is an object of the disclosed technique to provide a novel communication system and method for dynamically modifying a time division duplex (TDD) frame structure in tranceiving (i.e., transmitting and receiving) of data between at least two different communication entities. The communication system includes a network side entity, and at least one node. The network side entity and the at least one node are configured to be communicatively coupled with each other via respective at least one communication channel. The at least one node is configured to receive an upstream management symbol offset position with respect to a frame reference point (e.g., a TDD frame starting point). The upstream management symbol offset position is associated with an upstream management symbol that is configured to at least convey downstream acknowledgement data. The network side entity is configured to determine an updated frame structure to an existing (initial) frame structure. The frame structure defines at least a TDD frame downstream-to-upstream ratio. The updated frame structure includes information defining a transition point between downstream and upstream, and reference point indicating when the updated frame structure shall take effect. The network side entity is configured to employ the updated frame structure from the (time) reference point. At least part the nodes is configured to receive the updated frame structure, and to employ the updated frame structure from the reference point.

The method of the disclosed technique is configured and operative to dynamically modify a frame structure in transceiving of data between a network side entity and at least one node. The data is divided among a plurality of frames. The method includes the steps of providing an upstream management symbol offset position with respect to a frame reference point, where the upstream management symbol offset position is associated with an upstream management symbol that is configured to at least convey downstream acknowledgement data; providing an updated frame structure to the at least one node, receiving the updated frame structure by at least one node; and employing the updated frame structure from the reference point, by the network side entity (and typically at least one node in a synchronous manner). The updated frame structure includes information defining a transition point between downstream and upstream, and a reference point indicating when said updated frame structure shall take effect.

BRIEF DESCRIPTION OF THE DRAWINGS

The disclosed technique will be understood and appreciated more fully from the following detailed description taken in conjunction with the drawings in which.

DETAILED DESCRIPTION OF PREFERRED EMBODIMENTS

The disclosed technique overcomes the disadvantages of the prior art by proposing and implementing a method and system enabling dynamic resource allocation (DRA), more particularly, dynamic bandwidth allocation (DBA), which is also known interchangeably herein as "dynamic time assignment" (DTA), or "dynamic time allocation" for communication systems implementing the G.fast standard. In essence, the disclosed technique discloses a mechanism allowing for dynamically changing a time-division duplexing (TDD) frame configuration, which includes control over a transition point between downstream and upstream (i.e., consequently, a downstream-to-upstream ratio) during showtime (i.e., the operational state (e.g., "steady-state") of the communication link following successful completion of a digital subscriber line (DSL) link establishment process and initialization). The disclosed technique involves a communication system and communication method for dynamically modifying a frame structure in transceiving (i.e., transmitting and receiving) of data between a central (e.g., a multi-link-enabled) communication entity and at least one node (typically a plurality thereof). The data (e.g., a bitstream) is divided among a plurality of discrete frames. The communication system includes the network side entity and at least one node (typically a plurality thereof) configured to be communicatively coupled at least one respective communication channel (typically a plurality thereof). Each node is configured to receive an upstream management symbol offset position with respect to a frame reference point (e.g., a frame start position). The upstream management symbol offset position is associated with an upstream management symbol (e.g., a robust management channel (RMC) symbol) that is configured to at least convey downstream acknowledgement data (e.g., ACK/NACK). The network side entity is configured to determine an updated frame structure to an existing frame structure in transceiving of data between the network side entity and the at least one node. The updated frame structure includes information defining a transition point between downstream and upstream, and a reference point (e.g., a time reference point) indicating when the updated frame structure shall take effect. The at least one node is configured to receive the updated frame structure. Both network side entity and at least one node are each configured to employ the updated frame structure from the reference point (i.e., at least one of: (i) at the reference point, (ii) after the reference point). The reference point may be regarded as time-dependent. Each node has associated therewith its respective frame structure and updated frame structure (once updated, and in accordance with independent DBA update mode, described hereinbelow). In general, both the frame structure and the updated frame structure include downstream (DS) and upstream (US) management symbols that are configured and operative to convey management information. US management symbols are configured to at least convey DS acknowledgement data (for corresponding data transmitted in the DS direction by the network side entity). DS management symbols are configured to at least convey US acknowledgment data (for corresponding data transmitted in the US direction by at least one node). Acknowledgment data includes positive-acknowledgement (ACK), and negative-acknowledgement (NACK). ACK or NACK is generally denoted for brevity as "ACK/NACK".

The method of the disclosed technique includes providing an upstream management symbol offset position with respect to a frame reference point, where the upstream management symbol offset position is associated with an upstream management symbol that is configured to at least convey downstream acknowledgement data; providing an updated frame structure to the at least one node that includes information defining a transition point between downstream and upstream, and a reference point indicating when the updated frame structure shall take effect; receiving the updated frame structure by at least one node; and employing the updated frame structure at the reference point by the at least one node (and the network side entity).

The disclosed technique proposes a system and method for optimizing usage of G.fast over twisted-pairs, coax & CAT5 (category 5) cables via DBA. DBA according to the disclosed technique allows for a dynamic, seamless and independent change to the downstream-to-upstream time-division duplexing (TDD) ratio used for each of the different communication lines or twisted wire pairs that connect between a network side entity (e.g., embodied as distribution point unit (DPU)) and a plurality of nodes (e.g., embodied as a plurality of customer premises equipment (CPE) units), during showtime. DBA is relevant for deployment in scenarios involving G.fast over both low and high crosstalk media. In media exhibiting relatively low crosstalk levels, the dynamic bandwidth allocation may be different between the different lines, whereas in media exhibiting relatively high crosstalk levels the dynamic bandwidth allocation will be common to all the communication lines so as to avoid near-end crosstalk (NEXT), since the communication lines are clumped and cabled together in a binder.

The description of the disclosed technique includes two main parts in which the first part includes a complete proposal for the DBA feature in G.fast. The second part proposes a system architecture description, outlining how this feature can be implemented.

Figure 1:
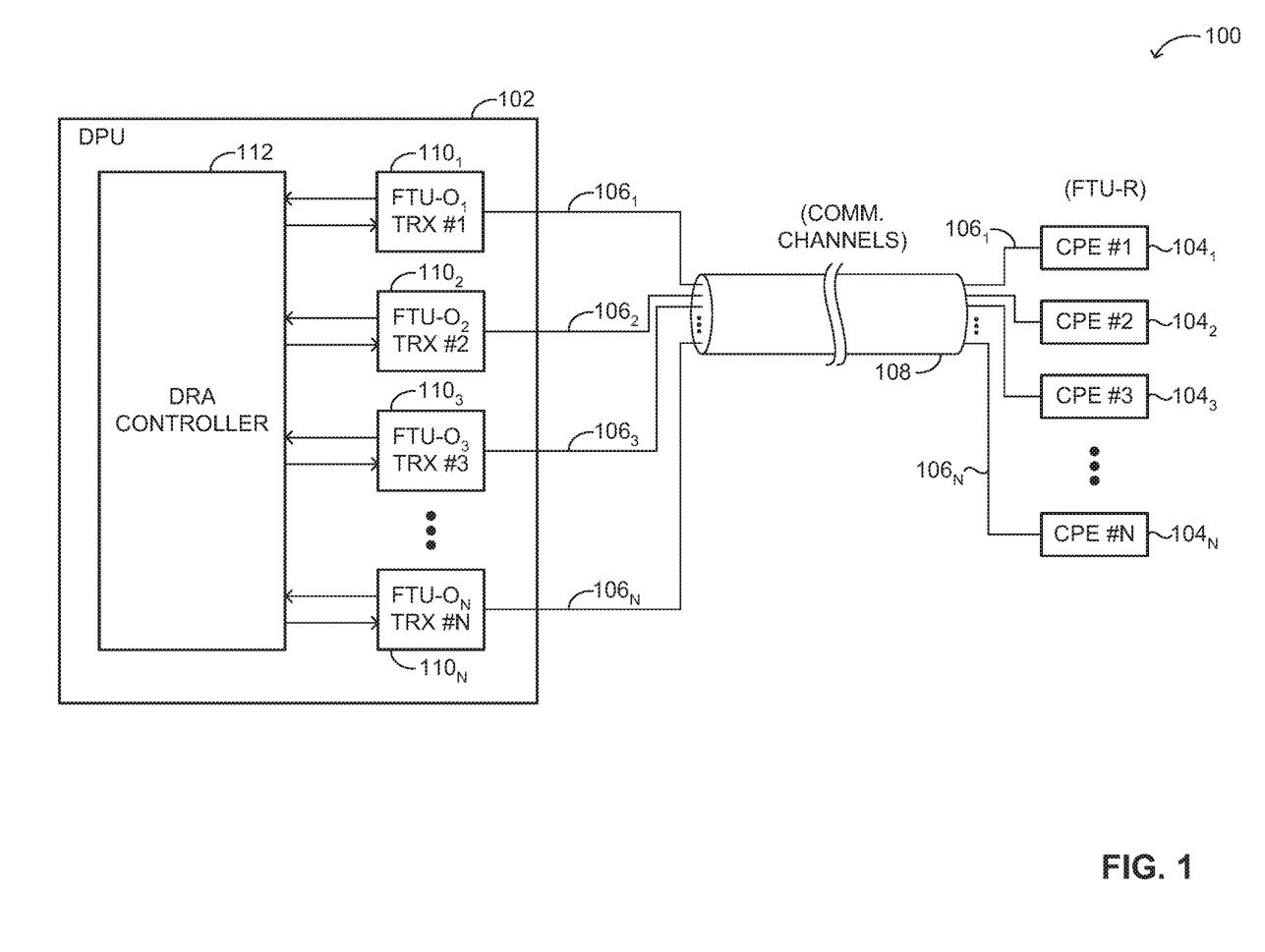
FIG. 1 is a schematic block diagram of an exemplary system embodying the principles of the disclosed technique, constructed and operative in accordance with an embodiment of the disclosed technique.

Reference is now made to FIG. 1, which is a schematic block diagram of an exemplary system embodying the principles of the disclosed technique, generally referenced 100, constructed and operative in accordance with an embodiment of the disclosed technique. System 100 includes a distribution point unit (DPU) 102 (also denoted herein interchangeably as "network side entity", and "distribution point" (DP), communicatively coupled to at least one (typically a plurality of) customer premises equipment (CPE) unit $104_1, 104_2, 104_3, \ldots, 104_N$ (also denoted herein interchangeably as "at least one node" or "nodes" in plural, where NW is an integer) via a plurality of N communication lines (also denoted herein interchangeably as "communication channels") $106_1, 106_2, 106_3, \ldots, 106_N$ (typically and at least partially passing through a binder 108). DPU 102 includes a plurality of N network-side fast transceiver unit (FTU-O) transceivers (TRXs) $110_1, 110_2, 110_3, \ldots, 110_N$, and a dynamic resource allocation (DRA) controller 112 (also denoted herein interchangeably as "dynamic bandwidth allocation (DBA) controller", or "processor"). Particularly, each FTU-O TRX $110_1, 110_2, 110_3, \ldots, 110_N$ is communicatively coupled with its respective CPE unit $104_1, 104_2, 104_3, \ldots, 104_N$ via its respective communication channel $106_1, 106_2, 106_3, \ldots, 106_N$ (i.e., index-wise). Each CPE includes a corresponding remote-end fast transceiver unit (FTU-R) (not shown) configured and operative to receive and to transmit data to-and-fro its respective FTU-O at the DPU 102. Specifically, each FTU-O$_i$ (where i is an integer running index) is configured to be in communication with a corresponding FTU-R$_i$ (not shown).

DPU 102 includes a dynamic resource allocation (DRA) controller 112 (also denoted interchangeably herein as "DRA processor" or simply "processor 112"), which is configured and operative to control and implement the steps of the disclosed technique (at the DPU or network side) including the control of resource allocations based on traffic requirements from the different links. A communication link or simply "link" is defined herein as a communication line or channel that is configured to communicatively couple between DPU 102 and one of CPE units $104_1, 104_2, 104_3, \ldots, 104_N$. DPU 102 a typically embodied as a multiple-link enabled device (e.g., a multi-port device) having a capability of communicating with a plurality of nodes (e.g., CPE units). Alternatively, DPU 102 is a single-link device having a capability of communicating with one node (e.g., a CPE unit). A transmission from DPU 102 to at least one of CPE units $104_1$, $104_2$, $104_3$, ..., $104_N$ is referred herein as in a downstream (DS) direction. Conversely, a transmission at least one of CPE units $104_1$, $104_2$, $104_3$, ..., $104_N$ to DPU 102 is referred herein as in an upstream (US) direction.

The disclosed technique proposes and is configured and operative to implement two modes of operation for DBA:

Independent DBA (also referred herein interchangeably as independent dynamic time allocation (DTA)), in which the TDD DS/US (downstream-to-upstream) (i.e., a transition point between downstream and upstream) is changed for each of the communication links in an independent manner (i.e., with respect to each other communication link). This mode of operation may be used in cases where there is no crosstalk between the communication lines and vectoring is disabled. System 100 employs independent DBA so as to optimize G.fast for twisted-pairs, coax and CAT5 topologies involving a point-to-point deployment having no crosstalk (FEXT and NEXT) between the different DPU-to-CPE communication links. Having no crosstalk allows each DPU-to-CPE communication links to have its own split or allocation between downstream and upstream, allowing for its dynamic modification independent of the other communication links.

Collective DBA (also referred herein interchangeably as collective DTA), in which the TDD DS/US (downstream-to-upstream ratio) (i.e., a transition point between downstream and upstream) is common (i.e., the same) to all communication links, whether static or changing for all of the communication links in the same manner and at the same time. This mode may be used for cases where there is crosstalk between the communication channels and vectoring is applied. According to this mode, where vectoring is used to eliminate the crosstalk, all the communication lines (belonging to the same vectoring group) shall share the same split between downstream and upstream (i.e., the same DS/US (downstream-to-upstream ratio)), however, this split may change over time in a collective way (e.g., in response to changing data traffic patterns), collectively and concurrently for all lines in this group.

The assumption is that the DBA mode is set by the service provider during installation, using at least one configuration parameter, setting the "mode of operation" to either work in "independent DBA" mode or "collective DBA" mode. In an alternative implementation, a mechanism to continuously monitor the crosstalk level is used (e.g., DPU 102 implemented) to determine levels of crosstalk (e.g., "low", "high"), consequently determining the mode of operation accordingly (i.e., either "independent DBA" mode or "collective DBA" mode). System 100 employing DBA allows to significantly maximize downstream and upstream data rates (i.e., the maximal data rate in each direction is nearly equal to the aggregate data rate). This makes this feature very appealing to service providers.

DTA involves the following basic components and functionalities, including:

DRA controller 112 located at the network side (DPU 102) for controlling DRA and triggering TDD DS/US changes. DRA controller 112 is configured and operative to monitor traffic information (e.g., requirements of data being communicated for each communication link, for both downstream (DS) and upstream (US)) and based on this information, determines whether or not to initiate (e.g., trigger) a change to TDD DS/US (also referred to herein as DS-to-US allocation) of specific links (in case of independent DBA), or all links of DPU 102 (in case of collective DBA). In addition, DRA controller 112 is configured and operative to control DBA in specific cases such as the joining of new links (e.g., at least one additional CPE unit enabling the establishment of a new DPU-to-CPE link), links undergoing re-initialization, and specific links not supporting DBA. DBA control is herein added to, and compatible with, a dynamic resource allocation (DRA) function defined in G.fast specifications.

Signaling an updated transition point between DS and US (i.e., TDD DS/US change) when triggered to do so by DRA controller 112. Each fast transceiver unit at the DPU (FTU-O) is configured and operative to signal the determined TDD DS/US change during showtime to its corresponding fast transceiver unit at the remote site (FTU-R).

Switching to a TDD frame with the updated DS/US: The FTU-R and FTU-O switch to the updated TDD DS/US at a reference point (e.g., a designated time), in a synchronized manner, as described hereafter.

Figure 2:
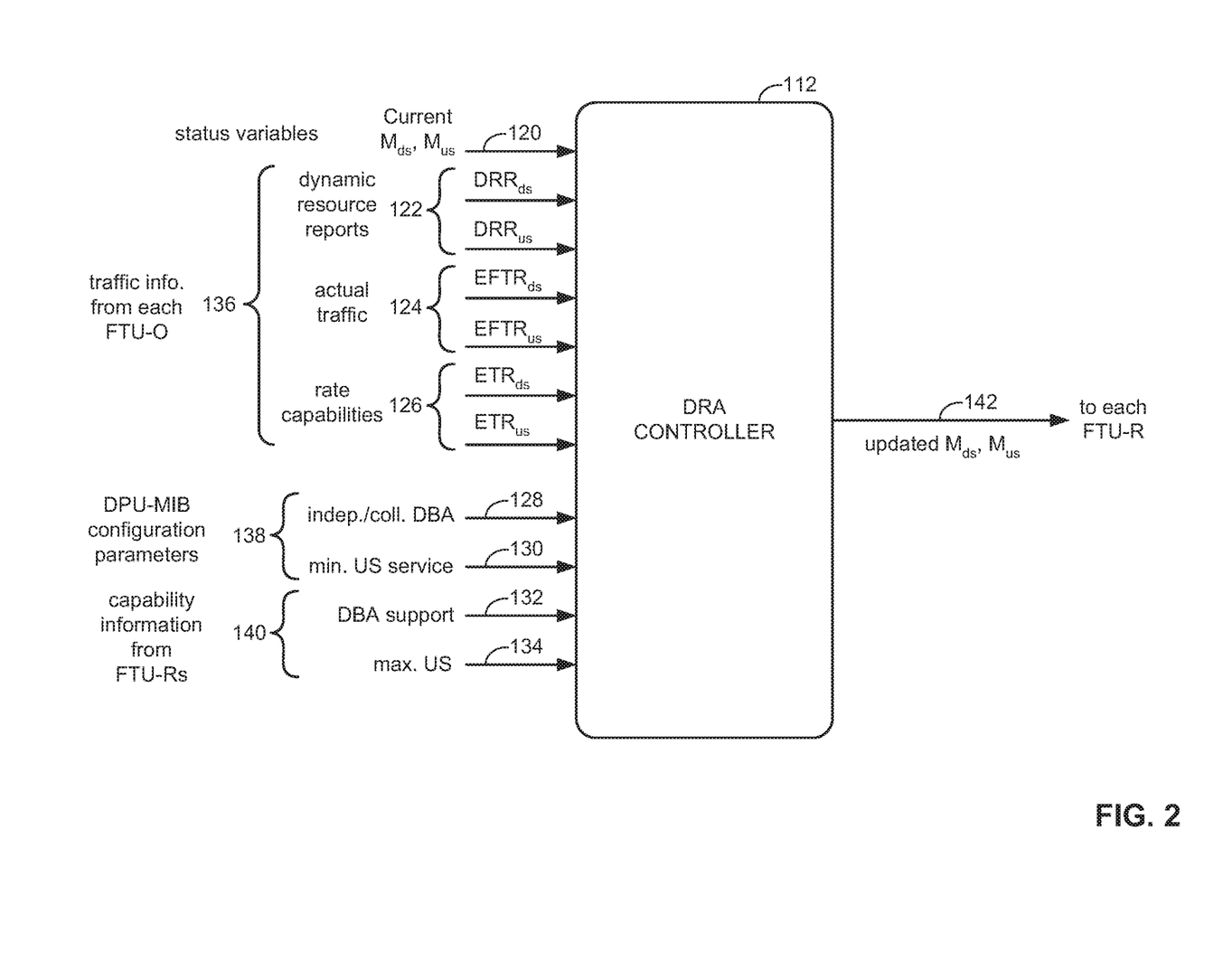
FIG. 2 is a schematic diagram showing DBA control functionality, constructed and operative in accordance with the embodiment of the disclosed technique.

Reference is now further made to FIG. 2, which is a schematic diagram showing DRA controller functionality, constructed and operative in accordance with the embodiment of the disclosed technique. FIG. 2 illustrates in greater detail DBA related functionality of the DRA controller 112, according to the disclosed technique, and specifically (including triggering of TDD DS/US changes). In particular, DRA controller 112 is configured and operative to receive the following inputs (diagrammatically shown on the left side of DRA controller 112 block):

An existing (current) TDD configuration 120, i.e., information defining a transition point between DS and US (e.g., TDD DS/US), denoted in FIG. 2 by $M_{ds}$ and $M_{us}$, which signify (respectively) the number of DS and US symbol positions in a current TDD frame. A symbol generally refers to a waveform, a signal, or a state of a communication medium (e.g., link, channel) that transpires over a particular time period (e.g., a time slot). A symbol typically encodes bits. A symbol position refers to a location of that symbol in a DS or US portion of a frame. Data is generally divided among a plurality of frames.

Traffic-related information from each FTU-O 136. Specifically, DRA controller 112 is configured and operative to continuously monitor the actual traffic per direction 124 and rate capabilities 126 of each link, including dynamic resource reports (DRR)s 122 in both downstream, ($DRR_{ds}$) and upstream ($DRR_{us}$) directions, the error free throughput (EFTR) in both downstream ($EFTR_{ds}$) and upstream ($EFTR_{us}$) directions, and expected throughput (ETR) in both downstream ($ETR_{ds}$) and upstream ($ETR_{us}$) directions. The DRR information provides indication on the traffic queues status per traffic flow direction.

Distribution point unit—management information base (DPU-MIB) configuration parameters 138 specifying the DBA mode 128: independent DBA (the TDD DS/US changes separately for each link) or collective DBA (the TDD DS/US changes collectively for all links), and minimum US service information 130.

Capability information from the FTU-Rs 140 including DBA support 132 and maximal US capability information 134.

Based on information of at least part of these inputs, DRA controller 112 is configured and operative to determine and output updated FTU-O TDD frame parameters 142, which includes information that defines a transition point between DS and US (e.g., DS-to-US TDD frame ratio, or equivalently $M_{ds}$, $M_{us}$ parameters). These parameters may change dynamically during showtime, as well as be different among the different links.

DRA controller 112 is configured and operative also to handle several special cases, which include:
- Some links are in the process of initializing (e.g., new links are established ("joining") or links undergoing re-initialization).
- Some links (i.e., specifically the CPEs) not supporting DBA.

These special cases are discussed in greater detail in the following sections in the description of the disclosed technique.

TDD DS/US Change with DBA Frame Structure

The DBA Basic Principle and Robust Management Channel (RMC) Symbol Positions

A core element of DBA is the switch from a TDD frame with one set of TDD parameters, namely a DS-to-US ratio, to another TDD frame with a different set of TDD parameters. This switch is referred to hereinafter as a "DBA update". An important element to consider, in the design of the DBA update and its impact on TDD frame components, is the robust management channel (RMC) symbol positions. The RMC symbols (DS and US) carry critical information such as online reconfiguration (OLR) and retransmission related information. For this reason the RMC is designed for maximal robustness. Also, the positions of the RMC symbols within the TDD frame play a major role in the implementation of transmission and reception processing pipelines.

The DBA update involves changing the transition point between DS and US in the frame, and given that the DS part is the first portion of the TDD frame, DS RMC symbols can remain fixed in their positions (i.e., preserved positions between frame structure and updated frame structure). This means that both the DS RMC symbol offset (DRMC$_{ds}$) (i.e., associated with a respective DS RMC symbol) with respect to a frame reference point (e.g., a frame starting position) and the absolute DS RMC symbol position within the TDD frame are unchanged when a DBA update occurs. Implementing this logic by the disclosed technique retains the robustness of the RMC, which is especially important if it is to convey DBA update messages themselves (i.e., the DBA update signaling protocol is discussed in the following section of the detailed description). It should be noted that in order to have a sufficiently large dynamic bandwidth for DBA, the DS RMC is positioned as early as possible within the DS portion of the TDD frame. With respect to US RMC symbol positions (i.e., each is associated with a respective US RMC symbol) there are two options for implementing the DBA update:

Option 1: changing $M_{ds}$ while keeping the US RMC symbol position fixed, (i.e., the latter is unchanged by a DBA update); and Option 2: changing $M_{ds}$ while keeping the US RMC offset ($D_{RMCus}$) fixed (i.e., the latter is unchanged by a DBA update).

Option 1 retains robustness of the US RMC, yet entails two "inconveniences". First, having the absolute position of the US RMC fixed, means that the US RMC offset ($D_{RMCus}$) needs to change. This requires changing this offset when executing a DBA update, or alternatively, modifying the definition of the offset to be relative to the TDD frame start position (not relative to the start of the US portion). Secondly, and perhaps more importantly, changing the US RMC offset means, implementation-wise that the pipelined design of the transmission and reception processing needs to change for each TDD configuration. The later argument may make option 2 more advantageous compared to option 1.

Figure 3:
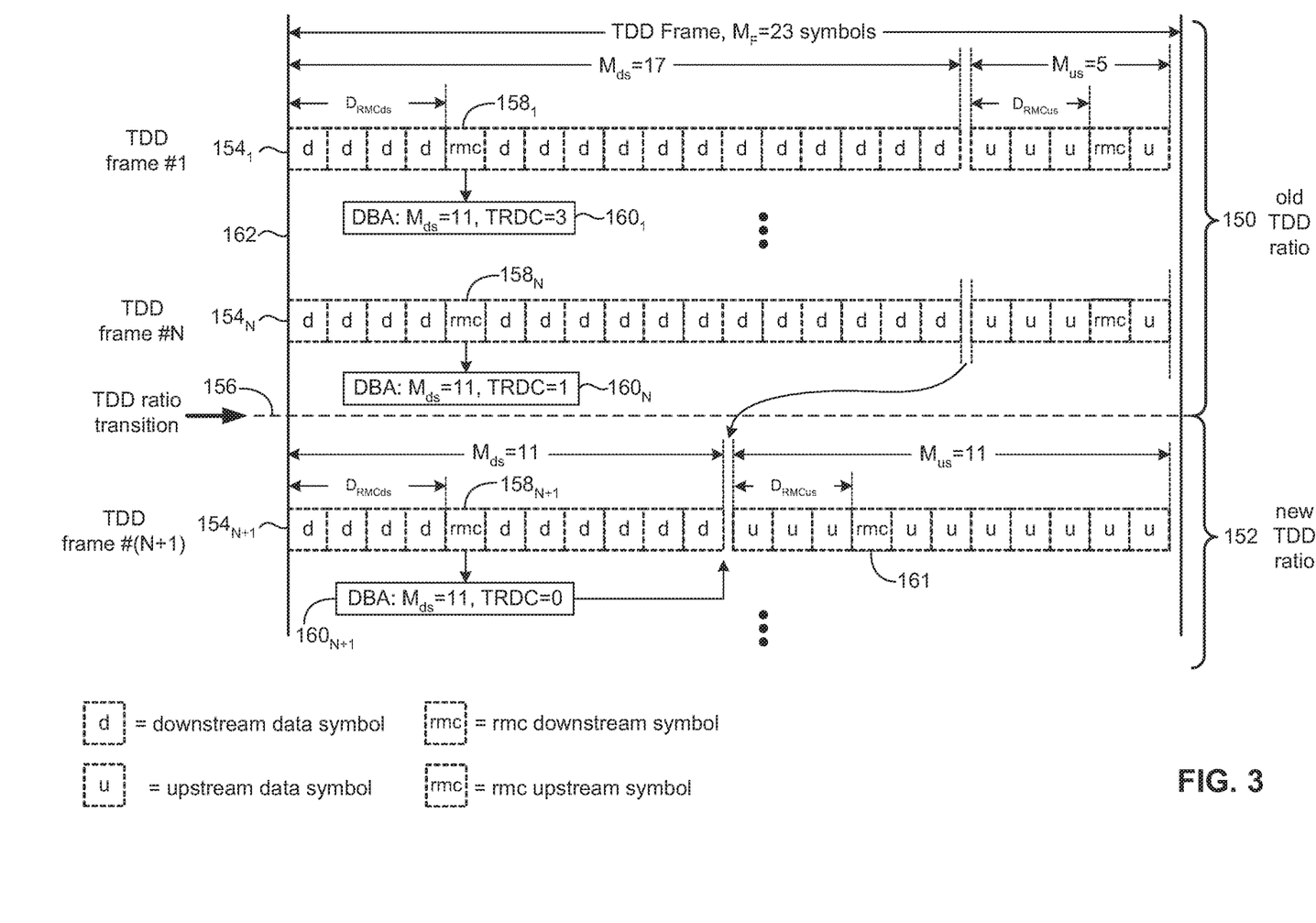
FIG. 3 is a schematic diagram showing a TDD downstream/upstream (ratio) change with DBA, constructed and operative in accordance with the embodiment of the disclosed technique.

Reference is now further made to FIG. 3, which is a schematic diagram showing a TDD downstream/upstream (ratio) change with DBA, constructed and operative in accordance with the embodiment of the disclosed technique. An advantageous approach for implementing DBA is for the TDD US/DS ratio changes ("DBA updates") to be based on the following basic principle described in conjunction with FIG. 3. FIG. 3 illustrates a current (old) TDD ratio 150 and a new TDD ratio 152 and how a transition occurs between them (i.e., from a particular frame structure to an updated frame structure), according to a DBA update. A DBA update generally refers to a modification or changing of the transition point between DS and US between two different TDD frames, during showtime, without changing the RMCs (DS and US) symbol offsets. Consequently, modifying the transition (i.e., switching) point between DS and US is equivalent to changing the $M_{ds}$ parameter of the TDD frame (or alternatively and vice-versa, the $M_{us}$ parameter). FIG. 3 illustrates a plurality of N+1 TDD frames (i.e., TDD frames 2 through N−1 are not shown), specifically TDD frame #1 154$_1$, . . . , TDD frame # N 154$_N$, and TDD frame #(N+1) 154$_{N+1}$, and a transition point 156 that occurs between TDD frame 154$_N$ and TDD frame 154$_{N+1}$. Each TDD frame includes a plurality of DS symbols ($M_{ds}$) and US symbols ($M_{us}$). $D_{RMCds}$ denotes a DS RMC symbol offset, and $D_{RMCus}$ denotes an US RMC symbol offset (typically set in an initialization). Note that the sum of time gaps between downstream and upstream is equivalent to the duration of 1 TDD symbol. TDD frame 154$_1$ illustrates that $M_{ds}$=17 (i.e., indicating that there are 17 DS symbols) and $M_{us}$=5 (i.e., indicating that there are 5 US symbols). The DS RMC symbols include information defining the transition point between DS and US (i.e., alternatively and equivalently, the $M_{ds}$ and/or $M_{us}$), as well as a (time) reference point indicating when the DBA update (defining an updated frame structure) shall take effect. Specifically, as shown in FIG. 3, DS RMC symbol 158$_1$ includes the following information (block 160$_1$): $M_{ds}$=11 and a TDD ratio down count (TRDC)=3 (time reference point). As time progresses and TDD frames are being transmitted and received between DPU 102 and CPEs, each DS RMC symbol repeats this information with a corresponding (time-wise) FDC value. In other words, DS RMC 158$_N$ includes the following information (block 160$_N$): Mds=11 and TRDC=1, meaning that transition point 156 is imminent and occurs after the current frame (when TRDC=0). As illustrated in FIG. 3, TDD frame 154$_{N+1}$ has implemented the new frame structure (according to the DBA update parameters) in which $M_{ds}$=$M_{us}$=11. The new (updated) frame structure includes an upstream management symbol 161 (i.e., a RMC management symbol) configured to at least convey downstream acknowledgement data (i.e., ACK/NACK) (i.e., transmitted earlier from DPU 102). DS RMC symbol 158$_{N+1}$ includes the following information (block 160$_{N+1}$): $M_{ds}$=11 and TRDC=0, indicating that an updated frame structure having new TDD ratio 152 is in effect. It is further noted:

$D_{RMCds}$ has not changed during the transition from old TDD ratio (old frame structure) 150 to new TDD ratio (new frame structure) 152, with respect to a frame reference point 162 (e.g., TDD frame start position).

$D_{RMCus}$ has not changed during the transition from old TDD ratio 150 to new TDD ratio 152 (i.e., with respect to US start position, as shown in FIG. 3).

With DBA active, the $M_{ds}$ value provided (from the FTU-O to the FTU-Rs) during G.hs (handshake) is typically an initial value. The $M_{ds}$ value may change during showtime using this DBA mechanism.

Impact on other definitions of the TDD frame include:

Making the DS/US transition follow the principles disclosed above, allows to keep most of the G.fast specification definitions. It is further noted that:

During the transition between a TDD frame with the old $M_{ds}$ value (conversely an old $M_{us}$ value) and the frame using the new $M_{ds}$ value, the DS ACK window (which is ending DS_ACK_WINDOW_SHIFT symbols prior to the end of the last symbol position in the DS portion of the TDD frame with the updated $M_{ds}$ value) will not be equal in length to 1 TDD frame. It may be longer or shorter than one TDD frame depending on whether $M_{ds}$ increased or decreased, respectively.

Analogously to the previous note, during the transition between old and new frame structures (modified DS-to-US TDD ratios), the length of the US logical frame (ending at the start of the US RMC symbol in the TDD frame having the updated $M_{ds}$ value) will not be equal in length to 1 TDD frame. It may be longer or shorter than one TDD frame depending on whether $M_{ds}$ increased or decreased, respectively.

Sync (Synchronization) Symbols Positions

Figure 4:
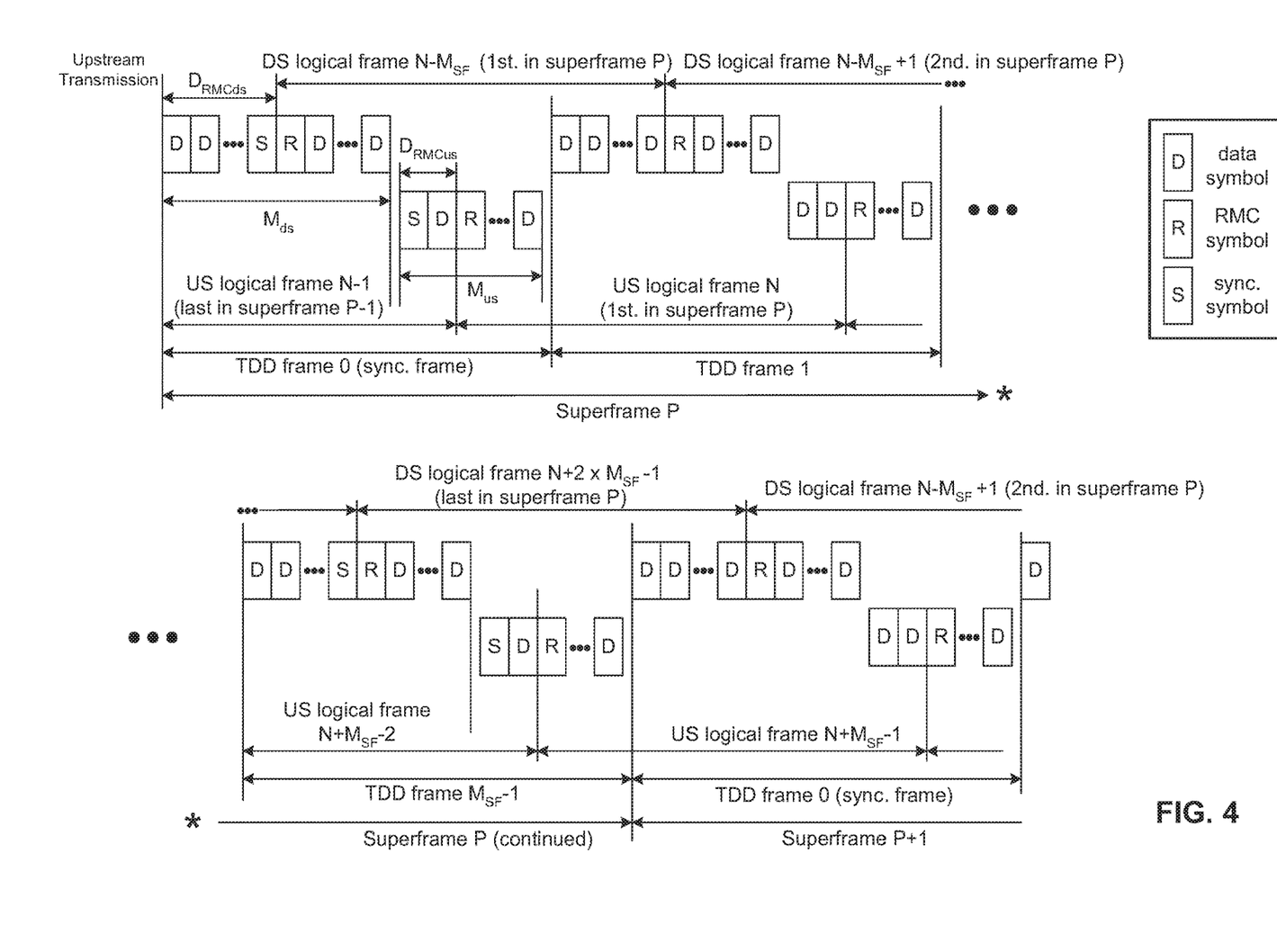
FIG. 4 is a schematic diagram illustrating sync symbol and RMC symbol positions relating to G.fast, constructed and operative in accordance with the embodiment of the disclosed technique.

Synchronization ("sync" for brevity) symbols are transmitted by both DPU 102 (downstream direction toward CPEs) and CPEs 104$_1$, 104$_2$, 104$_3$, . . . , 104$_N$ (upstream direction toward the DPU), during the initialization stages and during showtime. Sync symbols are modulated by probe sequences and are used for various estimations (e.g., vectoring-related estimations) and for tracking purposes. To further elaborate the details of the sync symbol and RMC symbol positions, reference is now further made to FIG. 4, which is a schematic diagram illustrating sync symbol and RMC symbol positions relating to G.fast, constructed and operative in accordance with the embodiment of the disclosed technique. FIG. 4 shows a sequence of different symbols (i.e., sync symbols, RMC symbols, and data symbols) and their corresponding relative positions shown in a hierarchical representation in descending order of superframe (SF), followed by TDD frames, US and DS logical frames and then followed by the individual symbols. Superframe P (partly shown at the top half of FIG. 4) is continued (partially shown) by superframe P+1 at the bottom half of FIG. 4. An implementation of the disclosed technique according to FIG. 4 is compatible with the G.fast specification and illustrates positions of sync symbols (denoted by a rectangle with the letter "S") within the TDD frames. Sync symbols are transmitted in the first TDD frame of every SF. This TDD frame herein referred to as the "TDD sync frame". RMC symbols are denoted in FIG. 4 by a rectangle with the letter "R"; data symbols are denoted with the letter "D". The disclosed technique is compatible with the G.fast specifications in that:

A DS sync symbol is located in a symbol position preceding a DS RMC symbol.

An US sync symbol is the first symbol in a US portion of the sync TDD frame.

In accordance with DBA of the disclosed technique:

A DS sync symbol shall be located as currently specified in the G.fast specifications (i.e., in a symbol position preceding the DS RMC).

An US sync symbol position may be viewed as more challenging, due to a need to support a collective DBA mode, in which it is assumed that crosstalk is present and vectoring is applied. The rest of this sub-section elaborates on collective DBA mode and the resulting implications on US sync symbol positions.

With collective DBA, assuming there is crosstalk between the communication lines and vectoring is active, the solution of the disclosed technique takes into consideration the following constraints:

1. A requirement guaranteeing that during initialization (i.e., when new communication links are established (e.g., CPEs connect with ("join") DPU 102) or when links undergo re-initialization) the US sync symbols of communication lines 106$_1$, 106$_2$, 106$_3$, . . . , 106$_N$ do not interfere with data being transmitted via the other communication lines due to the manifestation of crosstalk between the communication lines.

2. US sync symbols of different communication lines in the vectoring group need to be located at the same time position in order to allow vectoring feedback calculation.

3. Given that DBA is an optional feature specified in an amendment to G.fast, there is a need to support devices (namely CPEs) that do not support DBA (i.e., interoperability).

The disclosed technique proposes the following three options as proposals to possible locations of sync symbols (i.e., sync symbol positions):

Option 1: sync symbols are positioned at the first symbol position in the US part of the TDD sync frame.

Option 2: sync symbols are positioned at the last symbol positions in the US part of the TDD sync frame.

Option 3a: sync symbols are positioned at a symbol position, which is equal to a first symbol position of the US part of the TDD sync frame of a "default US configuration". The "default US configuration" is specified as a configuration with a minimum US portion with which DBA cannot function below it (i.e., have a frame with a smaller US portion, also referred herein as "minimally-operative"). This can be the very smallest US portion currently detailed in the G.fast specification (i.e., $M_{us}$=3 symbols for both $M_F$=36 & $M_F$=23, where "$M_F$" denotes the number of symbols per frame) or a larger US portion.

Notes for option 3a:

1. DBA cannot use an US portion smaller than that of the default configuration. This causes some loss in the DBA dynamic range (if the default configuration does not use the minimum US portion possible in the specification.)

2. DBA according to this option may result in a situation where the sync symbol location coincides with a planned position for the US RMC symbol. In such a case DPU 102 excludes this DBA configuration.

Option 3b: Similarly to option 3a, sync symbols are placed in a symbol position which is equal to the first symbol position of the US part of the TDD sync frame in the default US configuration, however, the symbol (directly) preceding the sync symbol is a "quiet" symbol (for the communication lines during showtime). A pair that includes a sync symbol with a preceding quiet symbol is referred to herein as a "special sync symbol".

Considering the requirements mentioned above, Table 1, below, compares the three options for sync symbol locations:

TABLE 1

A comparison between four options (alternatives) for sync locations.

| | Option 1 | Option 2 | Option 3a/3b |
|---|---|---|---|
| New lines join/existing lines undergo re-initialization | New comm. line configured to the default configuration) Forces DBA switch of other lines to the same default configuration of the lines in initialization for the entire startup time of these CPEs (otherwise they will not be at the same place - needed for vectoring). | No impact on DBA | Communication line undergoing initialization: configured to the default configuration Other communication lines: In option 3a: Forces DBA switch of other lines to the default configuration. until new/ initialization CPE completes timing adjustment (Note 1) In option 3b: DBA may continue uninterrupted |
| Some of the lines are connected to CPEs not supporting DBA | DBA cannot be used for the entire vectored group (DPU) | DBA cannot be used for the entire vectored group (DPU) | A line not supporting DBA will be configured to the default configuration, DBA will be applied to other communication lines |

(Note 1):
From the time the new lines join (i.e., new links established)/initialization, the CPE completes a timing adjustment, and the other communication lines may resume DBA. The new or initialized communication line will abide with collective DBA once it is in showtime.

General Notes:
For Greenfield installations, the disclosed technique is configured and operative to implement Option 2 (as may typically be the best solution). In general, the disclosed technique implements Option 3 over Option 1 (as the former is slightly advantageous over the latter).

For installations with potential legacy CPEs, or CPEs not supporting DBA for any other reason, the disclosed technique is configured and operative to implement Option 3a/3b.

Considering the need to support CPEs not supporting DBA, the disclosed technique is configured and operative to implement Option 3a/3b, which is/are the best option(s). Option 3b avoids the requirement to have all communication lines in showtime forced into the default TDD configuration when a particular line undergoes initialization. This is on account of having a quiet symbol preceding the sync symbol (i.e., introducing according to the disclosed technique a 2-symbol long "special sync symbol").

Figure 5:
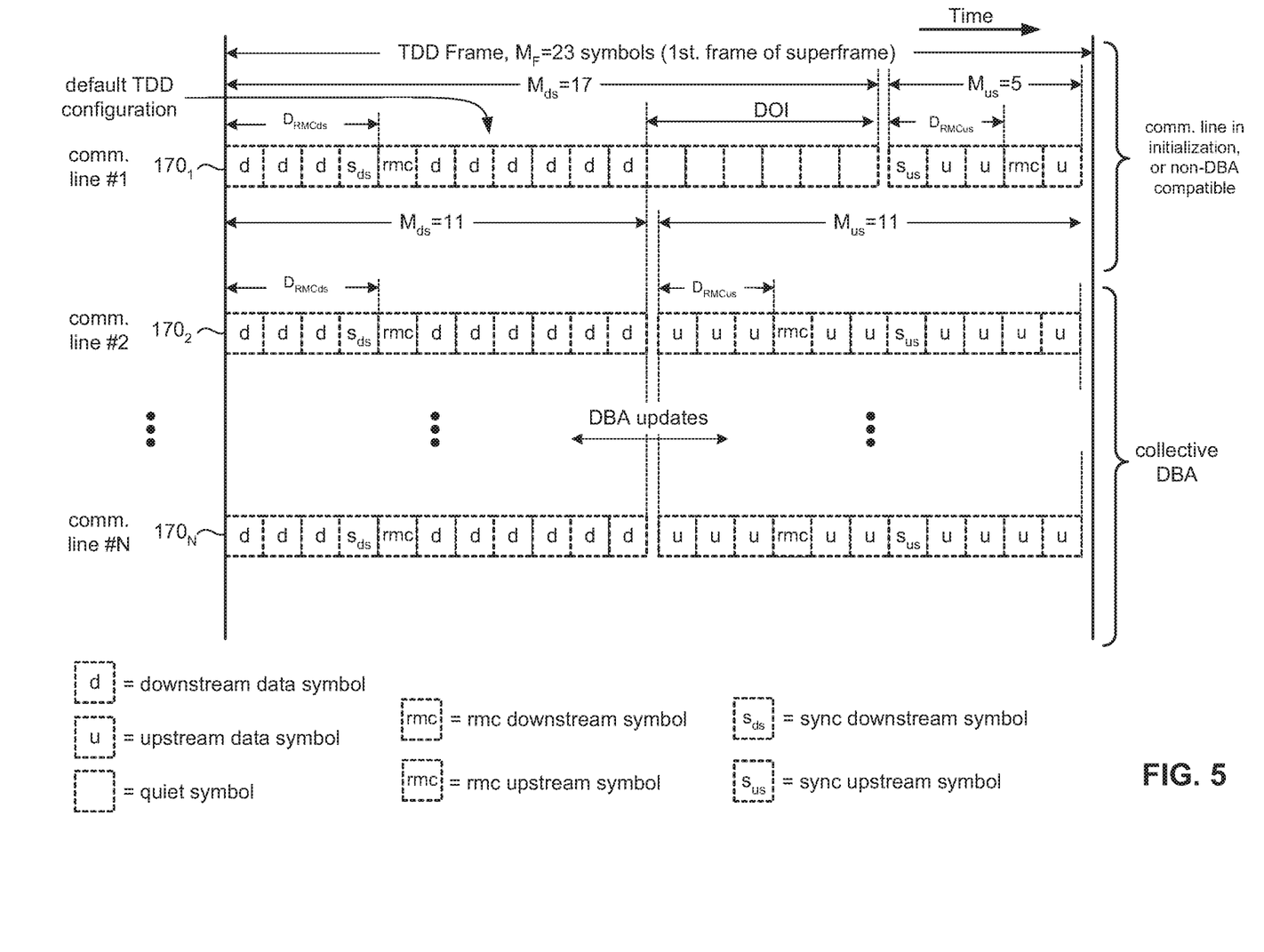
FIG. 5 is a schematic illustration showing locations of sync symbols according to one option, constructed and operative in accordance with the embodiment of the disclosed technique.

To further graphically elucidate the particulars of Option 3a, reference is now further made to FIG. 5, which is a schematic illustration showing locations of sync symbols according to one option (Option 3a), constructed and operative in accordance with the embodiment of the disclosed technique. FIG. 5 illustrates a first TDD frame of a SF including a plurality of symbols, for N communication lines 106$_1$, 106$_2$, ..., 106$_N$ (communication lines 3 through N−1 not shown), respectively denoted 170$_1$, 170$_2$, ..., 170$_N$. The specific example given in FIG. 5 illustrates system 100 implementing the collective DBA mode demonstrates DBA for a particular communication line undergoing initialization (i.e., communication line #1). Communication line #1 is configured to the default TDD configuration, during its initialization and is currently shown to have an old TDD frame structure (DS-to-US ratio, where $M_{ds}$=17 and $M_{us}$=5), whereas communication lines 2 through N implement a new TDD frame structure (DS-to-US ratio, where $M_{ds}$=11 and $M_{us}$=11 (symmetric)). The other communication lines, namely, 2 through N undergo collective DBA updates independently of the initialization of communication line #1 after this line has completed its initialization process.

Figure 6:
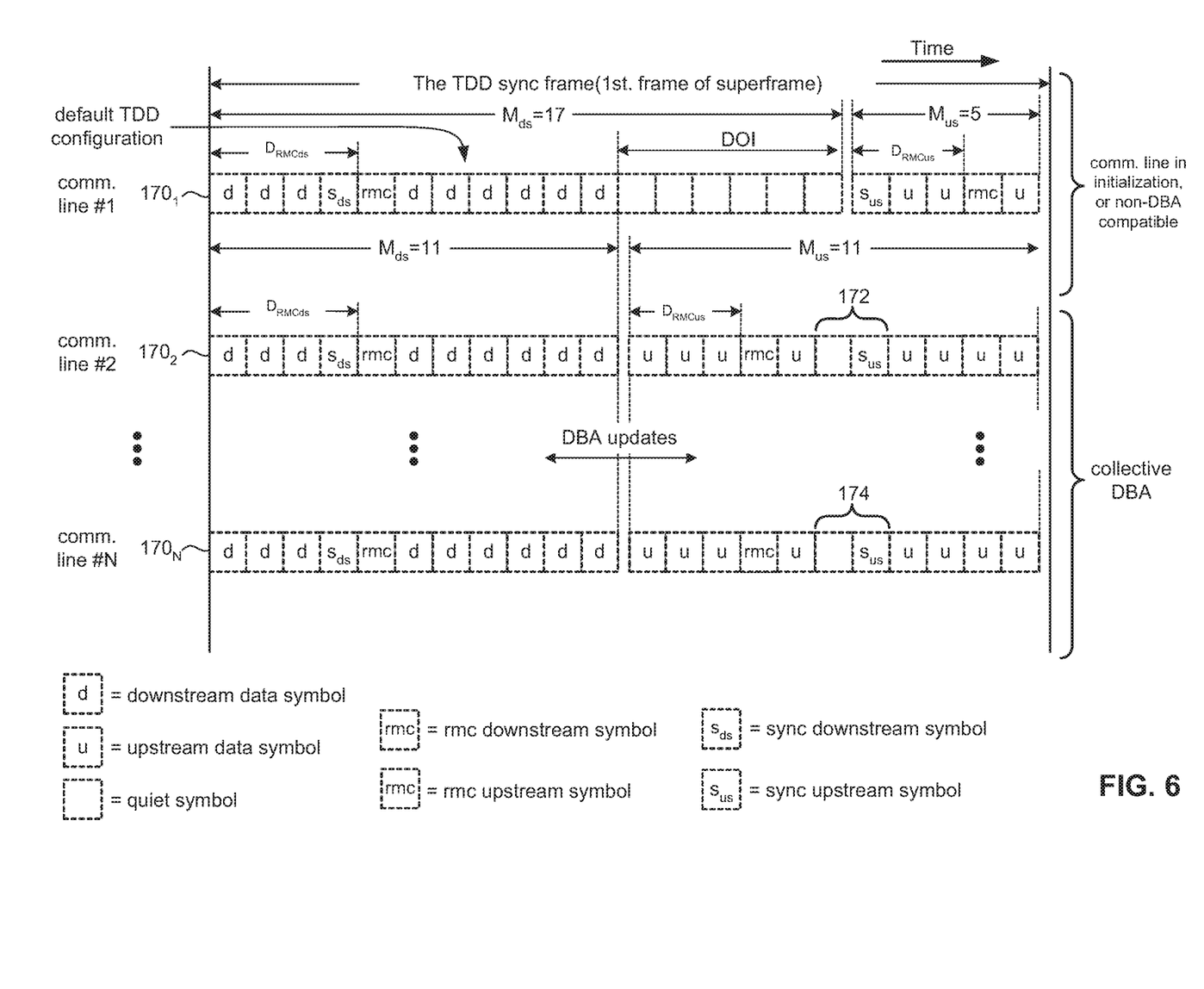
FIG. 6 is a schematic illustration showing locations of sync symbols according to another option, constructed and operative in accordance with the embodiment of the disclosed technique.

Reference is now further made to FIG. 6, which is a schematic illustration showing locations of sync symbols according to another option (Option 3b), constructed and operative in accordance with the embodiment of the disclosed technique. The specific example given in FIG. 6 illustrates the usage of a "special sync symbol" (i.e., special sync symbol 172 in the US portion of the TDD frame of communication line #2, and special sync symbol 174 in the US portion of the TDD frame of communication line # N). The special sync symbol is composed of a sync symbol (e.g., $s_{us}$) preceded by a quiet symbol. The special sync symbol is configured and operative to allow DBA to continue to run freely on communication lines during showtime without the need to configure them to the default TDD configuration during initialization of other lines.

DBA Signaling Protocol

The disclosed technique provides a DBA signaling protocol configured and operative to disseminate the DBA update. The disclosed technique takes into account several points or considerations in the signaling mechanism that is employed to deliver a DBA update indication from FTU-O (DP 102) to FTU-Rs (CPEs 104$_1$, 104$_2$, ..., 104$_N$):

The communication channel/method that is used.
The rate of change of the TDD ratio.
The synchronization method for TDD ratio changes between FTU-O and FTU-R.

Now in greater detail, each of these points is hereby addressed.

The communication method that is used is to signal a modification to the TDD frame structure (e.g., TDD ratio change) is through communication of RMC messages.
  Advantageously, RMC messaging is the most robust mechanism in G.fast.
  The disclosed technique uses a new management command (i.e., a RMC command) with a new op-code (to allow backward compatibility, i.e., for legacy devices not able to interpret this message—to ignore it).
  The new RMC command conveys the new $M_{ds}$ to be used (essentially, the DS/US transition point within the new TDD frame).
  In addition to $M_{ds}$, the new RMC command includes a counting mechanism (e.g., a countdown mechanism, a count-up mechanism, etc.) to synchronize the change (described hereafter in greater detail).

DBA updates (TDD ratio change) frequency:
  An example typical requirement from service providers is to change the TDD ratio according to time constants to be between every 1 SF=8 frames (with $M_F$=36)≈5.6 msec to 100 msec.

Considering the aforementioned, the TDD DS/US ratio may be changed once every 2-3 frames (or at worst once every 1 SF) which is viable by using RMC.

Signaling context and synchronization:

DPU 102 (FIG. 1) initiates the configuration change.

An exemplary mechanism to synchronize the change follows.

The disclosed technique employs a TDD ratio down count (TRDC) that indicates when the new configuration shall take effect.

A request for a TDD ratio change RMC command includes both the new $M_{ds}$ value as well as a TRDC value (e.g., an initial counter value).

Starting with TRDC=n (where n is an integer value), TRDC is decremented (by a known value, e.g., 1) in every TDD frame. The TDD ratio change will take effect in the TDD frame where TRDC equals zero.

The frames succeeding the change will include the $M_{ds}$ value along with TRDC=0, until a new change is needed (where the new $M_{ds}$ value will be given with TRDC=n)

Each of CPE 104$_1$, 104$_2$, . . . , 104$_N$, is configured and operative to acknowledge reception of this information (ACKs reception of all fields of the DS RMC command) using a RMC ACK bit.

Handling synchronization failures:

Synchronization failures are cases in which either the CPE fails to receive DBA update messages (i.e., failing to receive all DS RMC messages during the TRDC countdown period) or DPU 102 failing to receive acknowledgments (ACKs) on DBA updates received by the CPE (due to failures in receiving the US RMC messages), or both.

When DBA works in collective DBA mode, synchronization problems during the TDD ratio change might cause a single communication line to transmit at locations within the TDD frame, which may cause crosstalk in the other communication lines.

The solution of the disclosed technique:

DPU 102, after initiating the DBA update, switches to the new configuration (i.e., updated TDD frame structure) once TRDC reaches zero (i.e., the (time) reference point defining when updated frame structure takes effect), regardless of reception of ACK feedback from CPEs.

A CPE which does not receive any DS RMC message for a period of an "initial TRDC", which is a parameter made available (e.g., broadcast, distributed) by DPU 102 during initialization may do one of the following:

Stop transmitting until resuming reception of DS RMC messages.

Transmit the shortest allowed upstream transmission such that overlapping with downstream transmissions of other communication lines is not possible.

In other words, in the case where a particular CPE does not receive a DS RMC message during a minimum initial TRDC (time period), means that it has assigned all of the data transmission units (DTU)s in the last few ACK windows for retransmission (since these DTUs were not acknowledged, as specified in the G.fast specification). Notwithstanding, in such a case, transmission may still be advantageous so as to keep the upstream physical link active, by allowing it to track changes in the channel.

Upon receiving an indication from DRA controller 112, which is configured and operative to request a change to the TDD downstream/upstream ratio (DBA update/frame structure update), with the requested $M_{ds}$ parameter (conversely with any other parameter or set of parameters that define a transition point between downstream and upstream, e.g., $M_{us}$), DPU 102 is configured and operative, in response, to send a "request TDD DS/US ratio change" RMC command. This request is intended and functions to enable DPU 102 and CPEs to switch to the new TDD frame configuration (with the new $M_{ds}$ value) in a synchronized manner as hereinafter described.

The request TDD DS/US ratio change RMC command (see table below) contains the $M_{ds}$ parameter that defines a new TDD DS/US ratio, and a "TDD ratio change down count" (TRDC) field, the latter of which is a 4-bit frame down count used to indicate when the new TDD frame configuration (i.e. the frame using the new $M_{ds}$ value, and conversely and correspondingly a new $M_{us}$) shall take effect. The range of valid initial values of TRDC shall be, e.g., from 15 to 2. DPU 102 is configured and operative to communicate the minimal initial value of TRDC (i.e., a parameter), denoted as "min initial TRDC" during initialization. The following Table 2 tabulates specifics of a request TDD DS/US ratio change.

TABLE 2

Request TDD DS/US ratio change (sent by DPU 102 only)

| Field name | Format | Description |
| --- | --- | --- |
| Command header | 1 byte: [00 aaaaaa] | aaaaaa = 12$_{16}$ |
| Number of downstream symbols ($M_{ds}$) | 1 byte: [00 aaaaaa] | aaaaaa = the updated number of downstream symbol positions in the TDD frame. |
| TDD ratio change down count (TRDC) | 1 byte: [0000 aaaa] | aaaa = The frame down count to implementing the TDD DS/US ratio change. |

The first request TDD DS/US ratio change RMC command requesting an update of the TDD DS/US ratio (i.e. an update of the $M_{ds}$ value), includes a TDD ratio change TRDC value of n, where n is any value in the range of valid initial values of TRDC. Following this command, the DPU 102 is configured and operative to repeatedly send the request TDD DS/US ratio change RMC command with the new requested $M_{ds}$ value in the subsequent TDD frames, while decrementing TRDC in each TDD frame, until TRDC reaches the value zero thereby indicating the activation time of the new TDD frame configuration (i.e. the TDD frame using the new $M_{ds}$ value). In the following TDD frames, DPU 102 is configured and operative to continue sending the request TDD DS/US ratio change RMC command with the updated $M_{ds}$ value and TRDC=0, until a new request to update the TDD DS/US ratio (i.e., $M_{ds}$) is received from DRA controller 112. Alternatively, DPU 102 stops transmitting the request TDD DS/US ratio change once at least one CPE has acknowledged reception of the request TDD DS/US ratio change RMC command.

If a CPE does not receive any DS RMC command for a minimal initial TRDC period it is configured and operative to stop transmitting until the resumption in the reception of the DS RMC messages. DPU 102 may not initiate a new process to update the TDD frame configuration to a new $M_{ds}$ value before the previous request is implemented.

DBA Capabilities Negotiation

Figure 7:
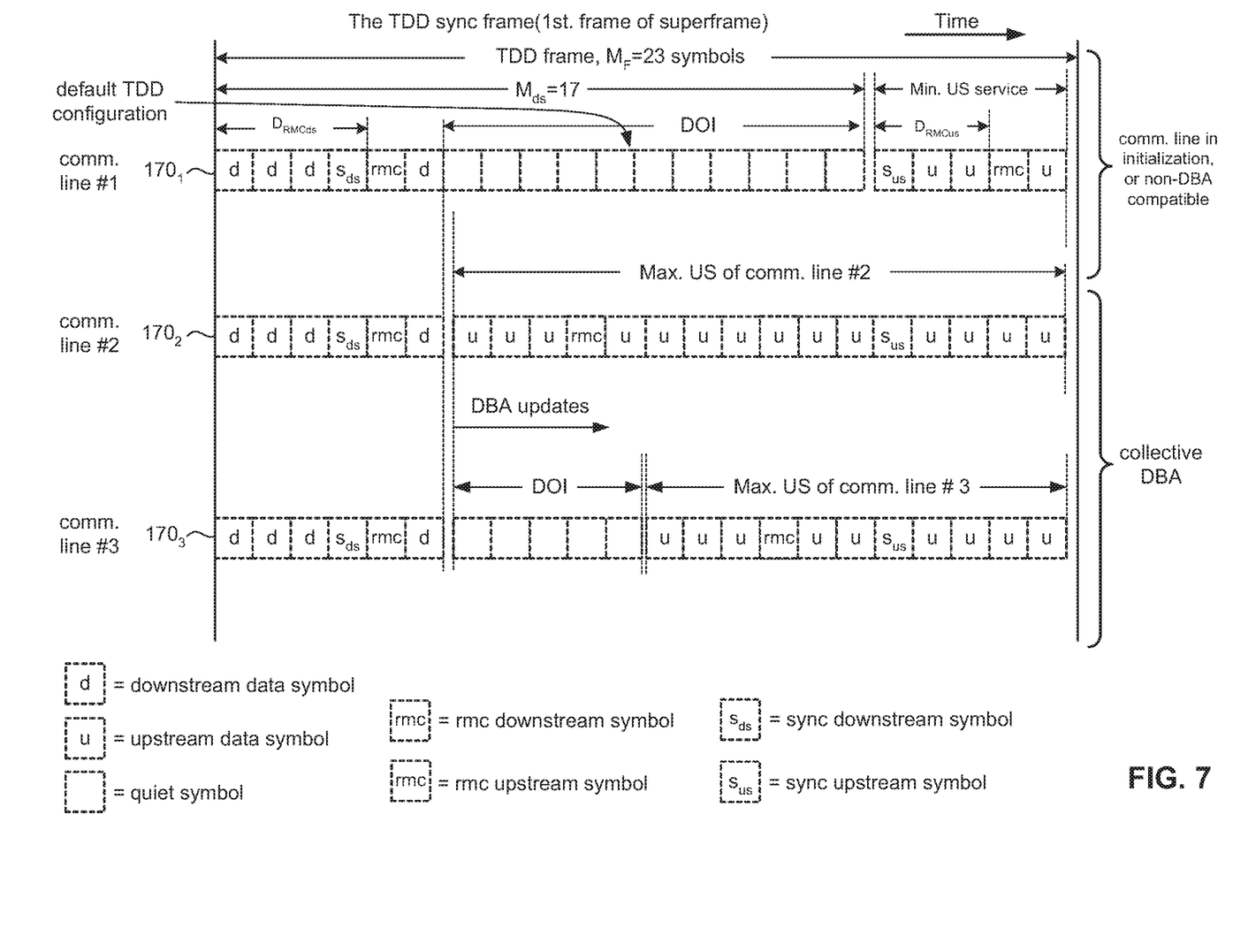
FIG. 7 is a schematic illustration showing the effect of negotiation on the DBA's dynamic range, when using a collective DBA mode, constructed and operative in accordance with the embodiment of the disclosed technique.

Reference is now further made to FIG. 7, which is a schematic illustration showing the effect of negotiation on the DBA's dynamic range, when using a collective DBA mode, constructed and operative in accordance with the embodiment of the disclosed technique. Two types of DBA capability-related information needs to be exchanged:
  DBA capability (DBA supported/not supported)
  DBA dynamic range (minimal US, maximal US)
The negotiation mechanism of the disclosed technique is as follows:
  During the G.hs (handshake) phase, the CPEs are configured and operative to communicate (e.g., report) their DBA capability ('DBA supported'/'DBA not supported') to DPU 102 (e.g., an expected behavior of DPU 102 and CPEs is that some of these devices do not support DBA is given separately in the description that follows). In other words, a handshaking procedure involves at least one node communicating to the network side entity, information pertaining to its supported capabilities relating to dynamic implementation of a modified frame structure (updated frame structure).
  During other initialization phases:
    DPU 102 is configured and operative to communicate (e.g., broadcast, transmit, announce) a "Min_US" parameter (equal to the service provider's configured "minimal US service" parameter).
    CPEs $104_1$, $104_2$, . . . , $104_N$ are configured and operative to respond, indicating their own "Max_US" parameter.
DPU 102 is configured and operative to determine the TDD frame ratio to use, based on the above inputs, in the following way:
In case DPU 102 is configured for independent DBA:
  1. DPU 102 sets the dynamic range separately for each line. This dynamic range per line i is equal to:

Dynamic_range$_i$=($M_F$–Min_US:Min_US) to ($M_F$–Max_US:Max_US$_i$)

2. Each communication line is controlled separately (without any regard to joining lines, lines undergoing re-initialization, or non-DBA supported communication lines).
In case DPU 102 is configured for collective DBA:
  1. DPU 102 sets a single ("collective") dynamic range, which is equal to:

Dynamic_range=($M_F$–Min_US:Min_US) to ($M_F$–max$_i$(Max_US):max$_i$(Max_US))

Where max$_i$(Max_US) is the maximum value, over all communication lines, of the Max_US indicated by the different communication lines.
  2. All communication lines in showtime are controlled (DBA-wise) together and are configured for a TDD ratio within the dynamic range described in bullet (1), except for lines indicating Max_US which is smaller than max$_i$(Max_US). For such communication lines the DBA update is executed as follows:
    If DRA controller 112 configures the other communication lines to a TDD configuration with an US portion larger than their indicated Max_US, DRA controller 112 configures these communication lines to work with a TDD ratio with an US portion equal to their own indicated Max_US, where the US symbols in the gap between Max_US of the line and max$_i$(Max_US), used for the other lines, shall be quiet symbols (also termed discontinuous operation interval (DOI)).
  3. Communication lines currently in initialization (new joining lines or lines in re-initialization) or alternatively non-DBA supported communication lines are configured to work in the default configuration.

FIG. 7 shows three communication lines, namely, $170_1$, $170_2$ and $170_3$, where communication line $170_1$ is either in the process of initialization, or alternatively, does not support DBA. FIG. 7 illustrates the frame structure of the first frame in a superframe (i.e., the frame which includes the sync symbols). As can be seen, for all of these three communication lines, the sync symbols are located such to coincide in time. Communication line $170_1$, in accordance with explanations brought forth above, is configured and operative to work with the minimum US portion, equal to the service provider's configured and/or defined "minimal US service" parameter. DRA controller 112 (FIGS. 1 and 2) is configured and operative to control the other communication lines, which have their US portion configured and operative according to their respectively reported (and/or defined) "Max_US" parameter. The US symbols in the gap traversing between minimal and maximal "Max_US" of communication lines $170_2$ and $170_3$ are quiet symbols.

Handling Joining Lines/Lines in Re-Initialization
  When DBA works in independent DBA mode:
    Communication lines joining and lines undergoing re-initialization (i.e., establishment of communication links) work with some fixed configuration during initialization. DBA for these communication lines starts when they are in showtime. There is no influence on other communication lines which are in showtime.
  For the collective DBA mode (controlled by DRA controller 112) according to the disclosed technique:
    New lines joining/lines in re-initialization are configured to work in the 'default TDD configuration" during start-up.
    DRA controller 112 is configured to force a 'DBA update' of other links to the default configuration at least until the links in start-up complete timing adjustments.

Handling Non-DBA Links
  An expected behavior in case some of the devices (DPU, CPEs) do not support DBA is as follows:
    In case DPU 102 does not support DBA, then DBA may not be used for the communication lines connected to it (regardless of the support status of its CPEs).
    In case DPU 102 supports DBA but some of the CPEs connected to it do not support DBA then:
      Non-DBA capable links (CPEs) work with the default TDD configuration (set during initialization, and fixed during showtime). It is noted that in Independent DBA, non-DBA links can work at any TDD configuration.
      DBA is applied to other links (independently or collectively).

It is noted that according to another aspect of backward compatibility of the disclosed technique relates to the DBA signaling mechanism. It is proposed to add a new RMC command to convey DBA updates with a new operation code ("opcode"), for legacy devices not enabled to interpret this command or devices not supporting DBA for some reasons, will ignore this command.

Figure 8:
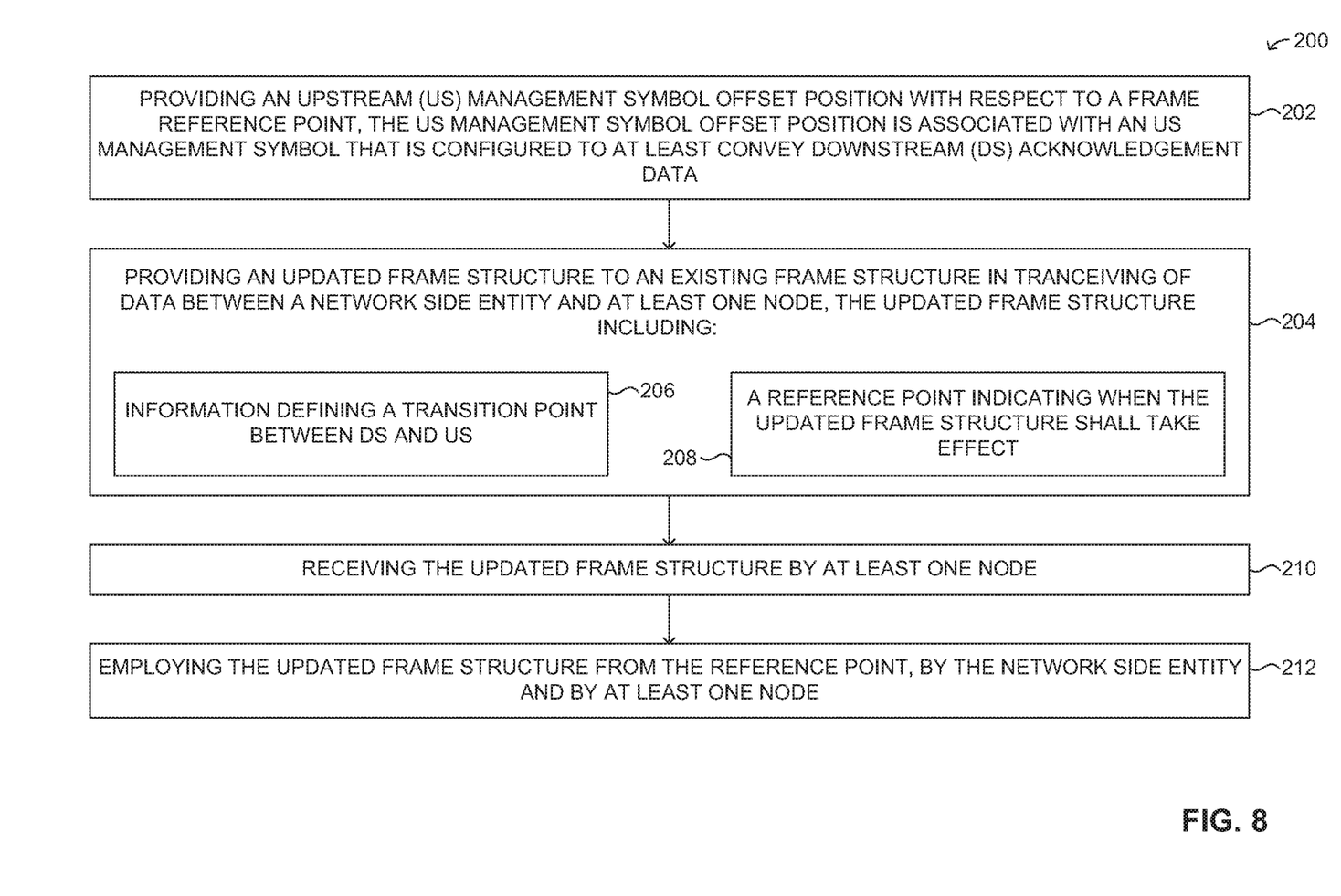
FIG. 8 is a schematic block diagram of a method for dynamically modifying a communication frame structure, constructed and operative in accordance with the embodiment of the disclosed technique.

Reference is now made to FIG. 8, which is a schematic block diagram of a method for dynamically modifying a communication frame structure, generally referenced 200, constructed and operative in accordance with the embodiment of the disclosed technique. Method 200 includes the following procedures. In procedure 202, an upstream (US) management symbol offset position with respect to a frame reference point is provided. The US management symbol offset position is associated with an US management symbol that is configured to at least convey downstream (DS) acknowledgement data. With reference to FIGS. 1 and 3, DP 102 (FIG. 1) provides (e.g., communicates, broadcasts) $D_{RMCus}$ (FIG. 3) to CPEs $104_1$, $104_2$, $104_3$, ..., $104_N$ (FIG. 1) in an initialization phase. The $D_{RMCus}$ (FIG. 3) is associated with US management symbol 161 (US RMC symbol) that is configured to at least convey DS acknowledgement data (e.g., ACK/NACK) pertaining to downstream transmitted data by DPU 102 toward CPEs $104_1$, $104_2$, $104_3$, ..., $104_N$ (FIG. 1).

In procedure 204, an updated frame structure to an existing frame structure, in tranceiving of data between a network side entity and at least one node, is provided. The updated frame structure includes (i) (block 206) information defining a transition point between downstream (DS) and US; and (ii) (block 208) a reference point indicating when the updated frame structure shall take effect. With reference to FIGS. 1 and 3, DPU 102 provides to CPEs $104_1$, $104_2$, $104_3$, ..., $104_N$ an updated frame structure 152 (FIG. 3) to an existing (old) frame structure 150. The updated frame structure includes DBA update information $160_1$, $160_2$, ..., $160_N$ including the number of DS symbols $M_{ds}$ and the TDD ratio change down count (TRDC) indicating when the DBA takes effect (i.e., frame #(N+1) $154_{N+1}$ in FIG. 3, when TRDC=0).

In procedure 210, the updated frame structure is received by at least one node. With reference to FIGS. 1 and 3, at least one of CPEs $104_1$, $104_2$, $104_3$, ..., $104_N$ (FIG. 1) is configured and operative to receive the updated frame structure (i.e., new TDD ratio 152).

In procedure 212, the updated frame structure is employed from the reference point by the network side entity and by at least one of the nodes. With reference to FIGS. 1 and 3, network side entity (i.e., DPU 102) and at least one of the nodes (i.e., CPEs $104_1$, $104_2$, $104_3$, ..., $104_N$) employ the updated frame structure (i.e., new TDD ratio 152) from (e.g., at and thereafter) the (time) reference point (i.e., TDD ratio transition point 156).

The Disclosed Technique Includes at Least the Following Highlights:

1. The disclosed technique provides a method for implementing DBA facilitating a fixed pipeline implementation under varying DS/US allocations. This scheme is based on either keeping the upstream RMC symbol position in a fixed location relative to the start of the TDD frame or keeping it in a fixed location relative to the end of the downstream transmission inside the TDD frame.
2. The disclosed technique provides a method and system for implementing DBA while maintaining compatibility with legacy devices not supporting DBA. This method is based on defining the location of the upstream sync symbol to be the symbol position equivalent to the position of the first symbol in a TDD sync frame of a default TDD configuration (devices not supporting DBA are configured to this default TDD configuration).
3. The disclosed technique provides a method and system for performing DBA updates on communication lines in showtime, irrespective of communication lines undergoing initialization.
4. The disclosed technique provides a method and system for implementing DBA using the robust management channel (RMC) to convey the changing TDD-frame configurations (TDD frame structure modifications) by communicating the next $M_{ds}$ parameter over RMC. The implementation of the new $M_{ds}$ configuration is defined by a down-counter indicating a (time) reference point (e.g., a transition time) in accordance with a predefined value, e.g., zero. The down-counter is updated once per frame or superframe and the transition is achieved in a synchronized manner on both sides of the communication link when the down-counter reaches the predefined triggering value (e.g., zero, or any other agreed-upon value). Alternatively, the counter is implemented as an up-counter configured and operative to reach a predefined triggering (e.g., execution) value.
5. The disclosed technique provides a method and system for communicating DBA updates such that a communication failure in one communication line will not cause errors in other communication lines, by limiting upstream transmissions during failure conditions so as to avoid NEXT to other lines. In the case of a communication failure, upstream transmissions are either avoided or limited to a minimum allowed time period.

The invention claimed is:

1. A method for dynamically modifying an existing frame structure in tranceiving of data between a network side entity and at least one node, the data is divided among a plurality of frames, the method comprising:
    providing an upstream management symbol offset position with respect to a frame reference point, said upstream management symbol offset position is associated with an upstream management symbol that is configured to at least convey downstream acknowledgement data;
    providing to said at least one node, an updated frame structure to said existing frame structure, including:
        information defining a transition point between downstream and upstream; and
        a reference point indicating when said updated frame structure shall take effect;
    receiving said updated frame structure by said at least one node; and
    employing said updated frame structure from said reference point, by said network side entity.

2. The method according to claim 1, wherein said employing said updated frame structure, from said reference point, is further employed by said at least one node.

3. The method according to claim 1, wherein said updated frame structure is applied according to one of:
    independently and correspondingly to each of said at least one node; and
    collectively to each of said at least one node.

4. The method according to claim 1, further comprising:
    monitoring traffic information pertaining to at least one communication link between said network side entity and respective said at least one node; and
    determining whether to trigger modification of said existing frame structure, based on said monitoring;
    wherein said traffic information is selected from: rate capabilities, dynamic resource reports (DRR), error free throughput (EFTR), and expected throughput (ETR).

5. The method according to claim 1, further comprising providing to said network side entity at least one of:
- management information base (MIB) configuration parameters pertaining to said existing frame structure; and
- capability information from said at least one node including at least one of: support for said dynamically modifying said existing frame structure, and maximal upstream capability information.

6. The method according to claim 1, wherein said existing frame structure includes a downstream management symbol whose downstream management symbol offset position remains unchanged with respect to the same in said updated frame structure.

7. The method according to claim 1, wherein said updated frame structure preserves said upstream management symbol offset position of an upstream management symbol, with respect to the same in said existing frame structure.

8. The method according to claim 6, further comprising: positioning a downstream synchronization symbol at a symbol position preceding said downstream management symbol.

9. The method according to claim 7, further comprising at least one of:
- positioning an upstream synchronization symbol at a first symbol position in an upstream portion of a synchronization frame;
- positioning an upstream synchronization symbol at a last symbol position in an upstream portion of a synchronization frame; and
- positioning an upstream synchronization symbol at a first symbol position in an upstream portion of a synchronization frame of a default configuration having a minimally-operative upstream portion.

10. The method according to claim 1, wherein said providing said updated frame structure is performed via a robust management channel (RMC) command.

11. A communication system comprising:
- a network side entity; and
- at least one node configured to be communicatively coupled with said network side entity via respective at least one communication channel, and to receive an upstream management symbol offset position with respect to a frame reference point, said upstream management symbol offset position is associated with an upstream management symbol that is configured to at least convey downstream acknowledgement data;
- wherein said network side entity is configured to determine an updated frame structure to an existing frame structure in transceiving of data between said network side entity and said at least one node, said updated frame structure includes information defining a transition point between downstream and upstream, and a reference point indicating when said updated frame structure shall take effect, said network side entity further configured to employ said updated frame structure at said reference point;
- wherein at least part of said at least one node is configured to receive said updated frame structure; and
- wherein said network side entity is further configured to employ said updated frame structure from said reference point.

12. The communication system according to claim 11, wherein said at least one node is configured to employ said updated frame structure, from said reference point.

13. The communication system according to claim 12, wherein said network side entity is configured to apply said updated frame structure according to one of:
- independently and correspondingly to each of said at least one node, such that each of said at least one node has associated therewith a respective updated frame structure; and
- collectively to each of said at least one node.

14. The communication system according to claim 11, wherein said network side entity includes a dynamic resource allocation (DRA) controller configured to determine said updated frame structure.

15. The communication system according to claim 14, wherein said DRA controller is further configured for monitoring traffic information pertaining to at least one communication link between said network side entity and respective said at least one node; and determining whether to trigger modification of said existing frame structure, based on said monitoring;
- wherein said traffic information is selected from: rate capabilities, dynamic resource reports (DRR), error free throughput (EFTR), and expected throughput (ETR).

16. The communication system according to claim 11, wherein said network side entity is further configured to receive at least one of:
- management information base (MIB) configuration parameters pertaining to said existing frame structure; and
- capability information from said at least one node including at least one of: support for dynamically modifying said existing frame structure, and maximal upstream capability information.

17. The communication system according to claim 11, wherein said existing frame structure includes a downstream management symbol whose DS downstream management symbol offset position remains unchanged with respect to the same in said updated frame structure.

18. The communication system according to claim 17, wherein said network side entity is further configured to position a downstream synchronization symbol at a symbol position preceding said downstream management symbol.

19. The communication system according to claim 11, wherein said updated frame structure preserves said upstream management symbol offset position of an upstream management symbol, with respect the same in said existing frame structure.

20. The communication system according to claim 19, wherein said network side entity is further configured to perform at least one of:
- position an upstream synchronization symbol at a first symbol position in an upstream portion of a synchronization frame;
- position an upstream synchronization symbol at a last symbol position in an upstream portion of a synchronization frame; and
- position an upstream synchronization symbol at a first symbol position in an upstream portion of a synchronization frame of a default configuration having a minimally-operative upstream portion.

* * * * *